US008059589B2

(12) United States Patent
Ji et al.

(10) Patent No.: US 8,059,589 B2
(45) Date of Patent: *Nov. 15, 2011

(54) DYNAMIC RESTRICTIVE REUSE SCHEDULER

(75) Inventors: Tingfang Ji, San Diego, CA (US); Edward Harrison Teague, San Diego, CA (US); David Jonathan Julian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 131 days.

This patent is subject to a terminal disclaimer.

(21) Appl. No.: 11/149,090

(22) Filed: Jun. 8, 2005

(65) Prior Publication Data

US 2006/0002360 A1    Jan. 5, 2006

Related U.S. Application Data

(63) Continuation-in-part of application No. 11/147,808, filed on Jun. 7, 2005.

(60) Provisional application No. 60/578,258, filed on Jun. 8, 2004.

(51) Int. Cl.
    H04W 4/00      (2009.01)
    H04L 12/43     (2006.01)
    H04W 40/00     (2009.01)
(52) U.S. Cl. ......... 370/329; 370/332; 370/461; 455/447
(58) Field of Classification Search .................. 370/328, 370/329, 332, 463, 252, 230, 430, 443, 461, 370/462, 468, 458; 455/447
    See application file for complete search history.

(56) References Cited

U.S. PATENT DOCUMENTS

| 4,639,914 A | | 1/1987 | Winters |
| 5,038,399 A | * | 8/1991 | Bruckert ...................... 455/447 |
| 5,210,771 A | | 5/1993 | Schaeffer et al. |
| 5,243,598 A | | 9/1993 | Lee |
| 5,355,522 A | | 10/1994 | Demange |
| 5,497,505 A | | 3/1996 | Koohogili et al. |

(Continued)

FOREIGN PATENT DOCUMENTS

EP          0658014          6/1995
(Continued)

OTHER PUBLICATIONS

International Search Report—PCT/US2006/021618, ISA/US, Nov. 13, 2007.

(Continued)

*Primary Examiner* — Andrew Wendell
(74) *Attorney, Agent, or Firm* — Donald C. Kordich

(57) ABSTRACT

Systems and methodologies are described that facilitate dynamically scheduling orthogonal resource sets for reuse by user devices to reduce inter-cell interference by evaluating an overall scheduling metric for each user device in a wireless communication region. The overall scheduling metric can be evaluated by determining a fairness metric for each user device in a wireless communication region, an overall channel peak desirability metric for each user device, and a channel delay desirability metric for each user device. The overall scheduling metric can be the function of the fairness metric and one or more of the overall channel peak desirability metric and the channel delay desirability metric. A user device with a highest overall scheduling metric score for a given round of dynamic scheduling can be awarded an orthogonal resource set.

21 Claims, 12 Drawing Sheets

U.S. PATENT DOCUMENTS

| | | | |
|---|---|---|---|
| 5,515,378 A | 5/1996 | Roy, III | |
| 5,649,292 A | 7/1997 | Doner | |
| 5,726,978 A | 3/1998 | Frodigh et al. | |
| 5,839,074 A | 11/1998 | Plehn | |
| 5,850,605 A | 12/1998 | Souissi et al. | |
| 5,852,780 A | 12/1998 | Wang et al. | |
| 5,884,145 A | 3/1999 | Haartsen | |
| 5,937,002 A | 8/1999 | Andersson et al. | |
| 5,937,003 A | 8/1999 | Sutterlin et al. | |
| 5,995,840 A | 11/1999 | Dorenbosch et al. | |
| 6,035,000 A | 3/2000 | Bingham | |
| 6,055,432 A | 4/2000 | Haleem et al. | |
| 6,067,290 A | 5/2000 | Paulraj et al. | |
| 6,069,885 A | 5/2000 | Fong et al. | |
| 6,088,416 A | 7/2000 | Perahia et al. | |
| 6,112,074 A | 8/2000 | Pinder | |
| 6,112,094 A | 8/2000 | Dent | |
| 6,223,041 B1 | 4/2001 | Egner et al. | |
| 6,356,531 B1 | 3/2002 | Soliman et al. | |
| 6,385,457 B1 | 5/2002 | Dam et al. | |
| 6,400,697 B1 | 6/2002 | Leung et al. | |
| 6,493,331 B1* | 12/2002 | Walton et al. | 370/341 |
| 6,512,752 B1 | 1/2003 | H'mimy et al. | |
| 6,522,885 B1 | 2/2003 | Tang et al. | |
| 6,549,784 B1 | 4/2003 | Kostic et al. | |
| 6,553,234 B1 | 4/2003 | Florea | |
| 6,591,106 B1 | 7/2003 | Zirwas | |
| 6,606,496 B1 | 8/2003 | Salvarani | |
| 6,643,277 B2 | 11/2003 | Garrison et al. | |
| 6,700,882 B1 | 3/2004 | Lindoff et al. | |
| 6,704,572 B1 | 3/2004 | Whinnett et al. | |
| 6,744,743 B2 | 6/2004 | Walton et al. | |
| 6,771,599 B1 | 8/2004 | Aoyama et al. | |
| 6,807,426 B2* | 10/2004 | Pankaj | 455/453 |
| 6,832,080 B1 | 12/2004 | Arslan et al. | |
| 6,870,808 B1 | 3/2005 | Liu et al. | |
| 6,871,073 B1* | 3/2005 | Boyer et al. | 455/450 |
| 6,914,876 B2 | 7/2005 | Rotstein et al. | |
| 6,917,580 B2 | 7/2005 | Wang et al. | |
| 6,934,340 B1 | 8/2005 | Dollard | |
| 6,947,748 B2 | 9/2005 | Li et al. | |
| 6,990,348 B1* | 1/2006 | Benveniste | 455/447 |
| 6,990,349 B1 | 1/2006 | Idrissi et al. | |
| 6,993,002 B2* | 1/2006 | Pan et al. | 370/335 |
| 6,993,006 B2 | 1/2006 | Pankaj | |
| 6,993,339 B2 | 1/2006 | Skillermark et al. | |
| 6,996,056 B2 | 2/2006 | Chheda et al. | |
| 7,006,466 B2 | 2/2006 | Borst et al. | |
| 7,042,856 B2 | 5/2006 | Walton et al. | |
| 7,046,654 B2* | 5/2006 | Chen | 370/347 |
| 7,054,308 B1 | 5/2006 | Conway et al. | |
| 7,062,276 B2 | 6/2006 | Xu et al. | |
| 7,076,637 B2 | 7/2006 | Kelley et al. | |
| 7,099,678 B2 | 8/2006 | Vaidyanathan et al. | |
| 7,133,680 B2 | 11/2006 | Crisan et al. | |
| 7,146,172 B2 | 12/2006 | Li et al. | |
| 7,151,755 B2 | 12/2006 | Xu et al. | |
| 7,151,756 B1 | 12/2006 | Park et al. | |
| 7,197,316 B2 | 3/2007 | Karger | |
| 7,221,653 B2 | 5/2007 | Vanghi | |
| 7,230,942 B2 | 6/2007 | Laroia et al. | |
| 7,242,958 B2 | 7/2007 | Chung et al. | |
| 7,257,410 B2 | 8/2007 | Chun et al. | |
| 7,260,077 B2 | 8/2007 | Wu et al. | |
| 7,272,110 B2 | 9/2007 | Lee et al. | |
| 7,295,513 B2 | 11/2007 | Elliott et al. | |
| 7,321,772 B2 | 1/2008 | Morimoto et al. | |
| 7,352,819 B2 | 4/2008 | Lakshmipathi et al. | |
| 7,366,202 B2 | 4/2008 | Scherzer et al. | |
| 7,392,054 B2 | 6/2008 | Cho et al. | |
| 7,437,182 B2 | 10/2008 | Lee et al. | |
| 7,603,127 B2 | 10/2009 | Chung et al. | |
| 2002/0061007 A1 | 5/2002 | Pankaj et al. | |
| 2002/0119781 A1 | 8/2002 | Li et al. | |
| 2002/0147017 A1 | 10/2002 | Li et al. | |
| 2002/0159405 A1* | 10/2002 | Garrison et al. | 370/328 |
| 2002/0197999 A1 | 12/2002 | Wu et al. | |
| 2003/0031130 A1 | 2/2003 | Vanghi et al. | |
| 2003/0050067 A1* | 3/2003 | Rozmaryn | 455/447 |
| 2003/0096618 A1 | 5/2003 | Palenius | |
| 2003/0123425 A1 | 7/2003 | Walton et al. | |
| 2003/0125040 A1 | 7/2003 | Walton et al. | |
| 2003/0134639 A1 | 7/2003 | Karger | |
| 2003/0176192 A1* | 9/2003 | Morimoto et al. | 455/453 |
| 2003/0227889 A1 | 12/2003 | Wu et al. | |
| 2004/0081121 A1* | 4/2004 | Xu | 370/329 |
| 2004/0114621 A1* | 6/2004 | Rotstein et al. | 370/462 |
| 2004/0209579 A1 | 10/2004 | Vaidyanathan et al. | |
| 2004/0209619 A1 | 10/2004 | Crisan et al. | |
| 2005/0048979 A1 | 3/2005 | Chun et al. | |
| 2005/0063389 A1 | 3/2005 | Elliott et al. | |
| 2005/0073973 A1 | 4/2005 | Laroia et al. | |
| 2005/0096061 A1 | 5/2005 | Ji et al. | |
| 2005/0096062 A1 | 5/2005 | Ji et al. | |
| 2005/0122999 A1 | 6/2005 | Scherzer et al. | |
| 2005/0141624 A1 | 6/2005 | Lakshmipathi et al. | |
| 2005/0181833 A1* | 8/2005 | Lee et al. | 455/562.1 |
| 2005/0237971 A1 | 10/2005 | Skraparlis et al. | |
| 2005/0282550 A1 | 12/2005 | Cho et al. | |
| 2006/0003794 A1 | 1/2006 | Chung et al. | |
| 2006/0019701 A1 | 1/2006 | Ji | |
| 2006/0023745 A1 | 2/2006 | Koo et al. | |
| 2006/0120478 A1 | 6/2006 | Kim et al. | |
| 2006/0188044 A1 | 8/2006 | Wang et al. | |
| 2007/0004419 A1* | 1/2007 | Ji et al. | 455/447 |
| 2008/0253319 A1 | 10/2008 | Ji et al. | |

FOREIGN PATENT DOCUMENTS

| | | |
|---|---|---|
| EP | 1178641 | 2/2002 |
| EP | 1473886 A2 | 11/2004 |
| GB | 2313742 | 12/1997 |
| JP | 06204938 | 7/1994 |
| JP | 2003-018091 | 1/2003 |
| JP | 2003018081 A | 1/2003 |
| JP | 2003153335 A | 5/2003 |
| JP | 2003304574 | 10/2003 |
| JP | 20030530009 | 10/2003 |
| JP | 2004208234 A | 7/2004 |
| JP | 2004254204 A | 9/2004 |
| JP | 2004533750 | 11/2004 |
| WO | 9602979 | 2/1996 |
| WO | WO9607288 A1 | 3/1996 |
| WO | 9701256 | 1/1997 |
| WO | 9746044 | 12/1997 |
| WO | 9749258 | 12/1997 |
| WO | 0059251 | 10/2000 |
| WO | 0176098 | 10/2001 |
| WO | 0233848 | 4/2002 |
| WO | WO0233648 A1 | 4/2002 |
| WO | 0249385 | 6/2002 |
| WO | WO03005674 A1 | 1/2003 |
| WO | 03052964 | 6/2003 |
| WO | WO2005043948 A2 | 5/2005 |
| WO | 2005125263 | 12/2005 |

OTHER PUBLICATIONS

Written Opinion—PCT/US2006/021618, ISA/US, Feb. 12, 2008.
Office Action issued in related U.S. Appl. No. 10/858,870 mailed Apr. 2, 2007.
Office Action issued in related U.S. Appl. No. 10/858,870 mailed Sep. 27, 2007.
Office Action issued in related U.S. Appl. No. 10/871,084 mailed Jul. 31, 2006.
Zhang et al. , "Enhanced feedback method for enhanced fast-feedback channels", IEEE 802.16 Broadband Wireless Access Working Group, (Online) pp. 1-9 (Nov. 15, 2004).
"M.M. Matalgah, et al., Throughput and Spectral Efficiency Analysis 3G FDD WCDMA Cellular Systems, Dec. 1-5, 2003, IEEE GLOBECOM, 03, vol. 6, pp. 3423-3426".
Bender, et al., "CDMA/HRD: A Bandwidth-Efficient High-Speed Wireless Data Service for Nomadic Users", IEEE Communications Magazine, Jul. 2000, pp. 70-77.
Taiwan Search Report—TW093132833—TIPO—Apr. 20, 2011.
Taiwan Search Report—TW093133004—TIPO—May 26, 2011.

* cited by examiner

DYNAMIC RESTRICTIVE REUSE SCHEDULER

CROSS-REFERENCE TO RELATED APPLICATIONS

This application claims benefit under 35 U.S.C. sctn. 119(e) from U.S. Provisional Patent Application Ser. No. 60/578,258 entitled Dynamic ASBR Scheduler and filed Jun. 8, 2004, and is a Continuation-in-Part of U.S. patent application Ser. No. 11/147,808 entitled "DYNAMIC ASBR SCHEDULER" and filed Jun. 7, 2005, the entireties of which are hereby incorporated by reference. This case is also related to co-pending patent application Ser. No. 10/871,084, filed on Jun. 18, 2004 and entitled "Restrictive Reuse for a Wireless Communication System".

BACKGROUND

1. Field

The following description relates generally to wireless communications, and more particularly to scheduling resource assignments to user devices in a wireless network environment.

2. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate thereover. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless cellular telephone communication can be split into 30 channels, each of which can carry a voice conversation or, with digital service, carry digital data. Each channel can be assigned to only one user at a time. One commonly utilized variant is an orthogonal frequency division technique that effectively partitions the overall system bandwidth into multiple orthogonal subbands. These subbands are also referred to as tones, carriers, subcarriers, bins, and frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. For example, the aforementioned variations can affect base station scheduling, power control and/or rate prediction for one or more mobile terminals.

Restrictive reuse is a technique designed to reduce inter-cell (or inter-sector) interference in wireless communication systems. Restrictive reuse is a global planning scheme that takes into account the channel and interference measured by users of a wireless network. Restrictive reuse seeks to reuse orthogonal resources (such as frequencies, time, codes, beams, spatial dimensions, etc.) for selected users based on channel quality associated therewith. Conventional static restrictive reuse algorithms are inflexible and cannot accommodate data traffic bursts or data traffic of varied fairness requirements, which results in a less robust user communication experience.

In view of at least the above, there exists a need in the art for a system and/or methodology of improving wireless communication and orthogonal resource allocation to users in a wireless network environment.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with providing a packet-based dynamic restrictive reuse scheduler in a wireless network environment. According to one aspect, a method of dynamically scheduling frequency sets for reuse by user devices to reduce inter-cell interference comprises determining a fairness metric for each user device in a wireless communication region, determining an overall channel peak desirability metric based on channel quality over multiple orthogonal resource sets for each user device, and determining an overall scheduling metric for each user device, the overall scheduling metric is the function of the fairness metric and the channel peak desirability metric. According to a related aspect, a channel delay desirability metric based on channel quality over multiple orthogonal resource sets can be determined for each user device, and the overall scheduling metric can employ the channel delay desirability metric in addition to or in place of the overall channel peak desirability metric. A user device with a highest overall scheduling metric score can be awarded a portion of the corresponding orthogonal resource set, and the method can be reiterated until all user devices have been assigned requested resources or all orthogonal resource sets have been assigned.

In this document, the frequency sets will be used as an embodiment of orthogonal resource sets to explain the dynamic restrictive reuse algorithm. However, various aspects set forth herein are directly applicable to other embodiments of orthogonal resources such as time slot, carriers, codes, spatial dimension, frequency/time interlaces and beamforming beams.

According to another aspect, a system that facilitates dynamic restrictive reuse frequency scheduling in a wireless network environment comprises a restrictive reuse scheduling component that determines an overall scheduling metric for each user device in the wireless network environment, a peak component that determines an overall channel peak desirability metric for each user device, and a delay component that determines a channel delay desirability metric for each user device. The dynamic restrictive reuse scheduling component can determine a fairness metric for each user device using an equal grade of service technique, a proportional fairness technique, or the like, which can be multiplied by one or more of the overall channel peak desirability metric and the channel delay desirability metric to identify a winning user device that can be awarded a frequency set during a given round of frequency set assignment. The system can additionally comprise a sorter component that excludes a winning user device from subsequent assignment iterations in order to ensure that all user devices receive a frequency assignment. Alternatively, the sorter component can include a winning user device in subsequent assignment iterations in order to permit the user device to obtain multiple frequency set assignments.

According to yet another aspect, an apparatus that facilitates scheduling frequency assignments for user devices in a wireless communication environment comprises means for determining a fairness metric for each user device in the communication environment, means for determining an overall channel peak desirability metric for each user device, means for determining a channel delay desirability metric for each device, and means for determining an overall scheduling metric score for each device, the scheduling metric score is a function of the fairness metric and one or both of the overall channel peak desirability metric and the and the channel delay desirability metric. Overall scheduling metric scores for individual user devices can be compared, and a user device with a highest score can be awarded a frequency set.

Another aspect provides for a computer-readable medium having stored thereon computer-executable instructions for determining fairness metric for each user device in a wireless network environment, for determining an overall channel peak desirability metric for each user device, and for determining a channel delay desirability metric for each user device. Additionally, the computer-readable medium can comprise instructions for determining a scheduling metric score based on the preceding metrics, which can be employed to determine a winning user device to which a frequency set can be awarded.

Still another aspect relates to a microprocessor that executes instructions for dynamic frequency set scheduling in a wireless communication network region, the instructions comprising: assessing a each of a fairness metric, an overall channel peak desirability metric, and a channel delay desirability metric for each of a plurality of user devices in the network region; determining an overall scheduling metric score for each user device that is based on the fairness metric and at least one of the overall channel peak desirability metric and the channel delay desirability metric; and awarding a frequency set to a user device with a highest overall scheduling metric relative to the other user devices in the network region.

To the accomplishment of the foregoing and related ends, the one or more embodiments comprises the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
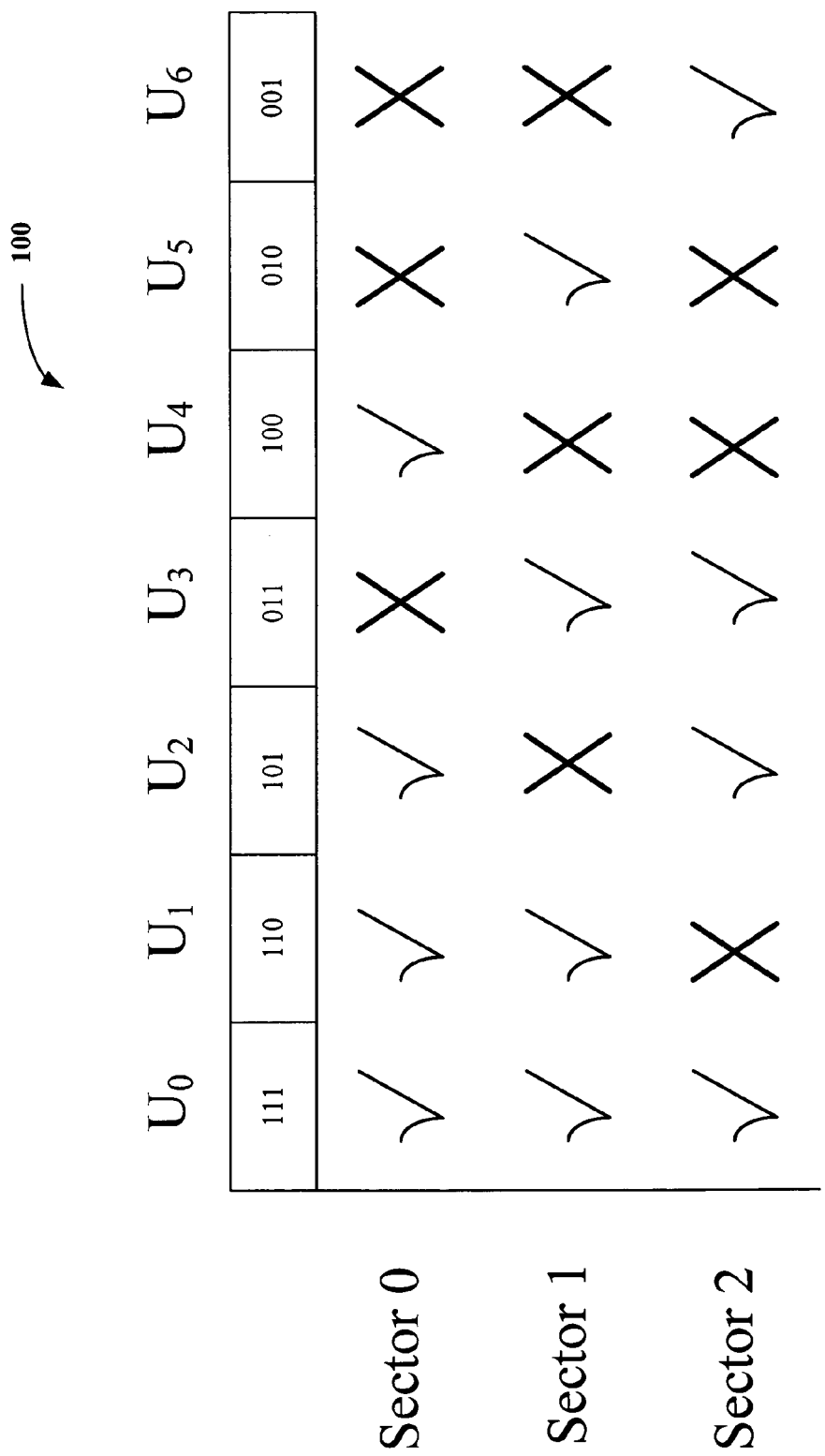
FIG. 1 illustrates a diagram that facilitates understanding of restrictive reuse and resource allocation with regard thereto.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. One or more components can reside within a process and/or thread of execution and a component may be localized on one computer and/or distributed between two or more computers. Also, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any non-transitory computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to the drawings, FIG. 1 illustrates a diagram 100 that facilitates understanding of restrictive reuse and resource allocation with regard thereto. An aspect of restrictive reuse is to intelligently deploy frequency for reuse by selected users based on the users' channel qualities. With regard to CDMA systems, an "active set" can be defined for each user for handoff purposes. Sectors in the active set of a user usually contribute interference to the user's reception on the forward link (FL), while sector transmissions are interfered with by the user's transmission on a reverse link (RL). By avoiding interference from various sectors in a user's active set, reduced interference on both FL and RL can be achieved. Simulations and analysis have shown that the frequency reuse assignment algorithm based on a user's active set yields a 3.5 dB signal-to-interference and noise ratio (SINR) improvement with 25% bandwidth partial loading.

Schedulers in wireless networks can be modified, according to various embodiments described herein, to take advantage of the SINR improvement through restrictive reuse. When dealing with voice transmission traffic, voice capacity is often limited by the SINR of the worst users in a network. Because a voice user will occupy some narrow portion of available bandwidth for a relatively long duration, a capacity improvement can be achieved by assigning a static frequency reuse set to the user to improve the user SINR throughout the duration of a call. However, in the case of data traffic, conventional static restrictive reuse algorithms are not flexible enough to accommodate "bursty" data traffic (e.g., traffic that is intermittent, etc.) and/or traffic of varying fairness requirements. When a user transmits/receives bursty traffic, conventional systems require a tradeoff to be made among frequency sets that have different SINR, available bandwidth, and offered load (e.g., from other users on a given reuse set). A scheduler can be further complicated if fairness criteria such as equal grade of service (EGoS) or proportional fairness need to be enforced for users from different reuse set.

Diagram 100 illustrates a simplified scenario in which communication bandwidth is divided into seven frequencies, $U_0$ through $U_6$, can be assigned to various sectors, over which the sectors can transmit and receive information. in the following exemplary restrictive reuse algorithm, each sector is assigned a value of 0, 1, or 2. The overall bandwidth available in a netwotk is divided into 7 frequency sets with universal reuse, 1/3 reuse and 2/3 reuse. Each reuse frequency set is then labeled with a 3-bit binary mask, where a "1" at the $i^{th}$ position indicates that it is used by sectors of value i. For example. 110 indicates a 2/3 frequency reuse set that is used by sectors of values 0 and 1 but not sectors of value 2. The labels of frequency sets $\{U_0, U_1, U_2, U_3, U_4, U_5, U_6\}$ are given by $\{111, 110, 101, 011, 100, 010, 001\}$. However, it will be appreciated that other labeling conventions are possible. For instance, the value of the three-bit mask can be employed to label the frequency set (e.g., wherein 111 denotes frequency set 7, 001 denotes frequency set 1, etc.). With frequency planning, users can avoid dominant interfemrs by using a 1/3 or 2/3 reuse frequency set.

In third-generation networks, the fairness among data users can be enforced by the scheduler. In a network where the forward link transmissions to users air time multiplexed, the user with the highest scheduling metric is typically scheduled for transmission over the scheduling time slot. The scheduling metric is usually computed based not only on a fairness metric but also on channel desirability, to take advantage of the multi-user diversity (MUD). For example, let $\lambda_i$ denote throughput of user i over a specified window, and let $\mu_i$ and $\bar{\mu}_i$ denote the instant and average spectral efficiency of user i, respectively. The fairness metric $F_i$ is given by:

$$F_i = \frac{1}{\lambda_i}, \tag{1}$$

for an EgoS scheduler, and $$F_i = \frac{\bar{\mu}_i}{\lambda_i}, \quad (2)$$

for a proportional fair scheduler. The channel desirability metric is given by:

$$T_i = \frac{\mu_i}{\bar{\mu}_i}. \quad (3)$$

The scheduling metric can be calculated as the output of a metric combining function of the fairness metric, and the channel desirability metric, The scheduling metric can be further combined with other QoS related metric $Q_i$ to make the final scheduling decision. In this invention, only fairness metric is used to illustrate the flexibility of the dynamic restricted reuse scheduler. In one embodiment, the combining function is a product as given by:

$$S_i = F_i T_i. \quad (4)$$

In another embodiment, the function is a product of the each metric raised by some exponents α and β as given by:

$$S_i = F_i^\alpha T_i^\beta. \quad (5)$$

In yet another embodiment, the function is a weighted sum of each metric raised by some exponents α and β as given by:

$$S_i = aF_i^\alpha + bT_i^\beta. \quad (6)$$

In yet another embodiment, the function is the maximum of the weighted metric raised by some exponents α and β as given by:

$$S_i = \max(aF_i^\alpha, bT_i^\beta). \quad (7)$$

Figure 2:
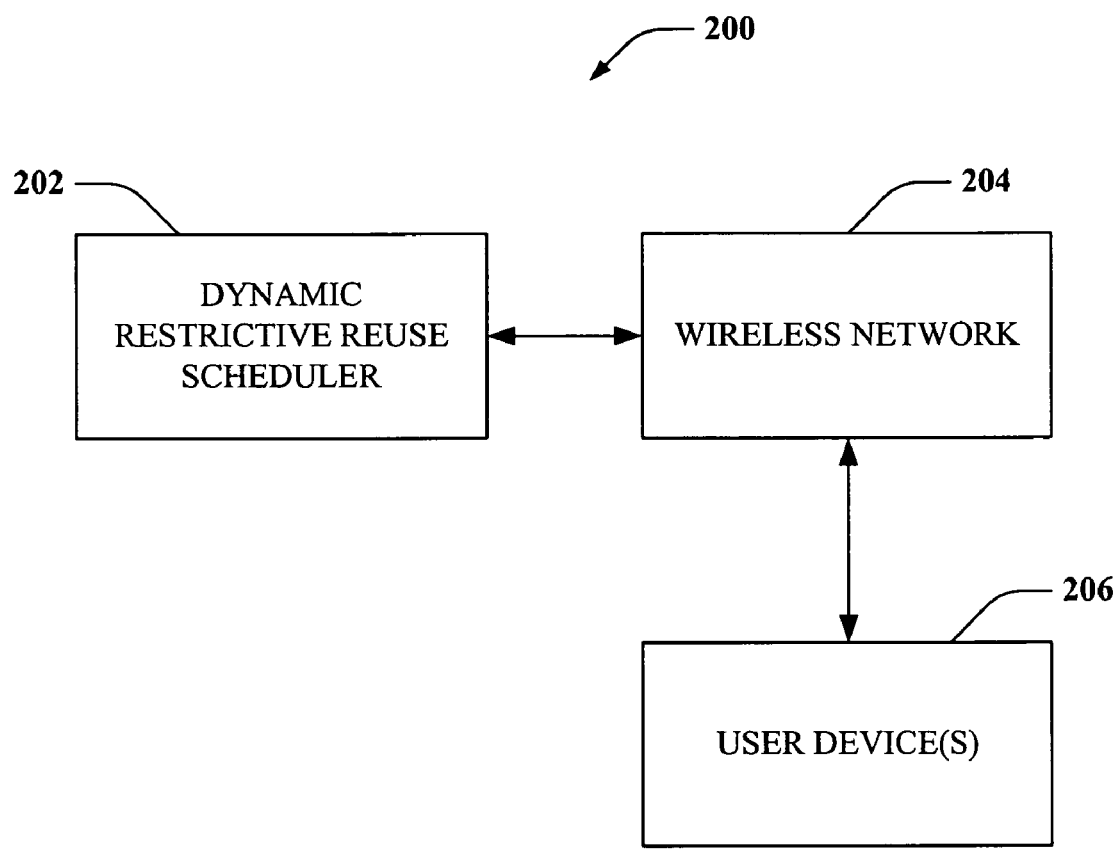
FIG. 2 is an illustration of a system that facilitates dynamically allocating network resources using restrictive reuse in accordance with one or more embodiments.

FIG. 2 is an illustration of a system 200 that facilitates dynamically allocating network resources using restrictive reuse in accordance with one or more embodiments. A dynamic restrictive reuse scheduler component 202 is operatively coupled to each of a wireless network 204 and a user device(s) 206. Wireless network 204 can comprise on or more base stations, transceivers, etc., that transmit and receive communication signals from one or more user devices 206. Additionally, wireless network 204 can provide communication service to user devices 206 in conjunction with a variety of multiple access techniques, a combination thereof, or any other suitable wireless communication protocol, as will be appreciated by one skilled in the art. For example, these techniques may be used for a code division multiple access (CDMA) system, a frequency division multiple access (FDMA) system, a time division multiple access (TDMA) system, an orthogonal frequency division multiple access (OFDMA) system, an interleaved (IFDMA) system, a localized FDMA (LFDMA) system, a spatial division multiple access (SDMA) system, a quasi-orthogonal multiple-access system, and so on. IFDMA is also called distributed FDMA, and LFDMA is also called narrowband FDMA or classical FDMA. An OFDMA system utilizes orthogonal frequency division multiplexing (OFDM). OFDM, IFDMA, and LFDMA effectively partition the overall system bandwidth into multiple (K) orthogonal frequency subbands. These subbands are also called tones, subcarriers, bins, and so on. Each subband is associated with a respective subcarrier that may be modulated with data. OFDM transmits modulation symbols in the frequency domain on all or a subset of the K subbands. IFDMA transmits modulation symbols in the time domain on subbands that are uniformly distributed across the K subbands. LFDMA transmits modulation symbols in the time domain and typically on adjacent subbands.

User devices 206 can be, for example, a cellular phone, a smartphone a PDA, a laptop, a wireless PC, or any other suitable communication device over which a user can communicate with the wireless network 204. User devices 206 may also provide feedback to wireless network 204 to enhance the scheduler performance. For FL scheduling, the channel and interference condition at user devices 206 could be measured by 206 and explicitly feedback to 204 and 202. For RL scheduling, the channel condition of user devices and the interference level over different orthogonal resource set could be directly measured at 204 based on pilot transmitted by 206. The RL transmit power of user devices 206 could be explicitly feedback to 204 and 202. Dynamic restrictive reuse scheduler component 202 is a packet-based scheduler that can employ frequency reuse as a scheduling dimension in addition to EGoS and proportional fairness criteria without requiring utilization of a static frequency reuse set. Dynamic restrictive reuse scheduler component 202 can determine a scheduling metric in a manner similar to that set forth above with regard to FIG. 1 in order to facilitate frequency set assignment to one or more user devices 206. Additionally, dynamic restrictive reuse scheduler component 202 can employ a dynamic restrictive reuse algorithm to facilitate assessing channel desirability. Dynamic restrictive reuse scheduler component 202 can assess fairness criteria to determine $F_i$ as described above, which can be augmented by desirability metrics when assigning frequency reuse sets. Two channel desirability metrics are defined with regard to various embodiments to enable restrictive reuse frequency set selection as detailed below. For the rest of this document, one specific embodiment of the dynamic restricted reuse scheduler, where the orthogonal resource sets are frequency sets, will be explained for ease of understanding.

Figure 3:
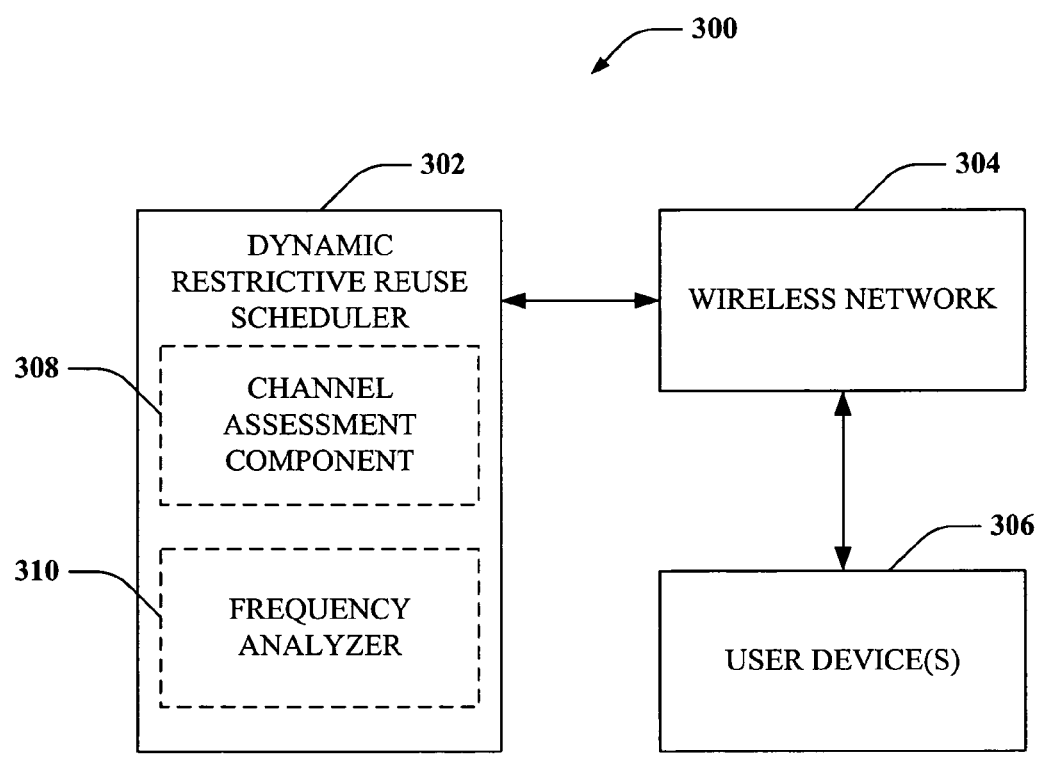
FIG. 3 is an illustration of a system that facilitates packet-based scheduling of frequency sets utilizing a dynamic restrictive reuse scheduling technique.

FIG. 3 is an illustration of a system 300 that facilitates packet-based scheduling of frequency sets utilizing a dynamic restrictive reuse scheduling technique. System 300 comprises a dynamic restrictive reuse scheduler component 302 operatively associated with a wireless network 304 and one or more user devices 306, each of which are in turn operatively associated with the other. Dynamic restrictive reuse scheduler component 302 further comprises a channel assessment component 308 facilitates scheduling connections with the best relative channel conditions over available frequency sets. Additionally, in a scenario in which a given connection's more desirable frequency sets are occupied, channel assessment component 308 can facilitate delaying connections for later scheduling in order to provide conflict resolution functionality to dynamic restrictive reuse scheduler component 302.

Dynamic restrictive reuse scheduler component 302 additionally comprises a frequency analyzer 310 that can assess total available bandwidth in wireless network 304 and can parse such bandwidth into frequency sets. For example, in a case such as described with regard to FIG. 1, frequency analyzer 310 can assign frequency sets to sectors for reuse to the exclusion of other frequencies. Such assignments can be, for instance, universal reuse sets, 2/3 reuse sets, 1/3 reuse sets, etc.

Figure 4:
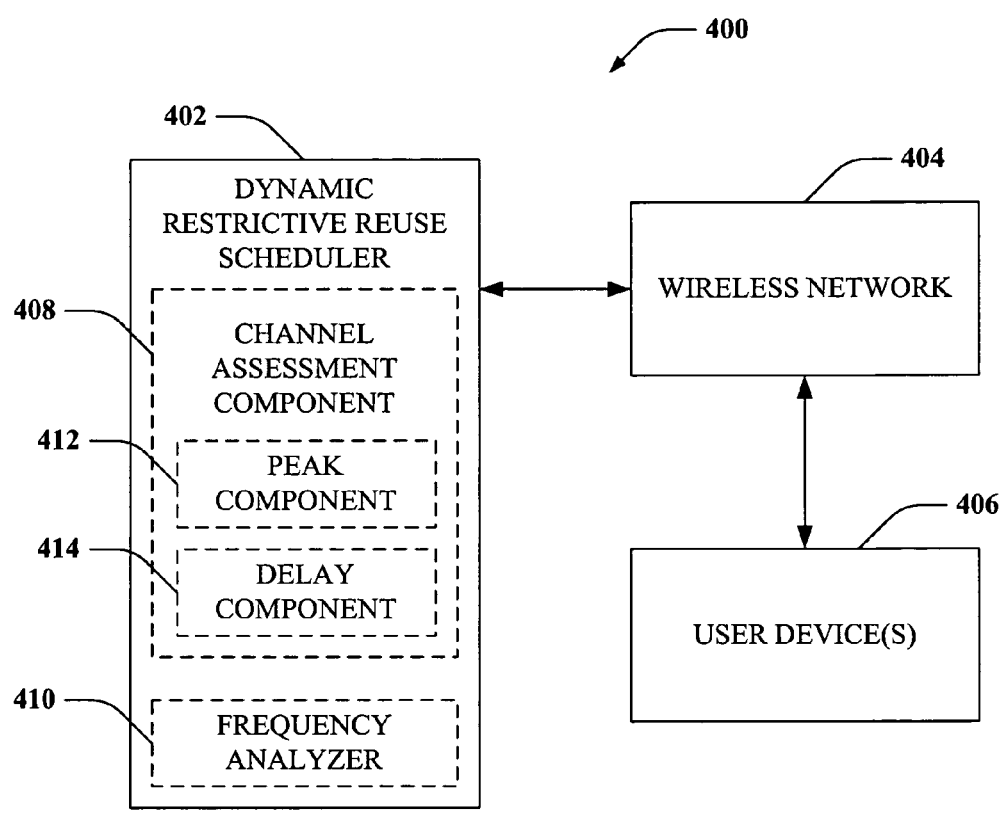
FIG. 4 illustrates a system that facilitates dynamic restrictive reuse scheduling of frequency reuse sets based on channel desirability and channel delay, in accordance with various aspects set forth herein.

FIG. 4 illustrates a system 400 that facilitates dynamic restrictive reuse scheduling of frequency reuse sets based on channel desirability and channel delay, in accordance with various aspects set forth herein. System 400 comprises a dynamic restrictive reuse scheduler component 402 that is operatively associated with each of a wireless network 404 and one or more user devices 406. Dynamic restrictive reuse scheduler component 402 comprises a channel assessment component 408 that facilitates scheduling connections with best relative channel conditions over available frequency sets, and a frequency analyzer 410 that determines appropriate bandwidth partitions for assignment of frequencies to sectors and/or user devices in a paging region.

Channel assessment component 408 comprises a peak component 412 that determines channel peak desirability to facilitate scheduling connections, and a delay component 414 that delays scheduling of connections whose more favorable frequency sets are currently fully scheduled. In systems with no restrictive reuse, the channel peak component is simply a function of the instant channel condition and average channel condition. In a restrictive reuse system, both channel peak component 412 and channel delay component 414 take into account different interference levels a user experiences in different frequency sets. For example, peak component 412 can assess channel peak desirability such that, for each frequency set j, the channel peak desirability factor of user i is given by:

$$T_{i,j} = \frac{\mu_{i,j}}{\overline{\mu}_i}, \quad (8)$$

where $\mu_{i,j}$ is the instant spectral efficiency of user i over frequency set j, and $\overline{\mu}_i$ is the average spectral efficiency of user i over all the restrictive reuse frequency sets. The average spectral efficiency can be calculated as the algebraic average of the filtered spectral efficiency $\overline{\mu}_{i,j}$ over each restrictive reuse frequency set $U_j$, or the weighted average of $|U_j|\overline{\mu}_{i,j}$ where $|U_j|$ denotes the size of $U_j$.

The overall channel peak desirability factor of user i is given by:

$$T_i = \max_{j \in \{free\ frequency\ set\}} T_{i,j}, \quad (9)$$

where the maximization is carried out over non-restricted frequency sets that are not already fully scheduled. For example, the scheduler of a sector of value 0 can restrict the channel desirability factor to be computed over frequency sets that are not fully scheduled, and not over one of the 011, 010 and 001 sets F*ig*. 1. The factor $T_i$ reflects the instant channel desirability of a user on the user's best available frequency set relative to the user's average channel quality. The channel peak desirability factor $T_i$ does not reflect the potential benefit for a user to wait for an unavailable frequency set to become available. Rather, such can be defined by the channel delay desirability metric.

Delay component 414 can determine a second restrictive reuse channel desirability metric, channel delay desirability, which is defined by:

$$D_{i,j} = \frac{\mu_{i,j}}{\max_{k \in \{scheduled\ frequency\ set\}} \mu_{i,k}}. \quad (10)$$

When no frequency sets have been scheduled, the denominator in $D_{i,j}$ can be replaced by the minimum spectral efficiency over all frequency sets. The overall delay desirability factor is given by:

$$D_i = \max_{j \in \{free\ frequency\ set\}} D_{i,j}, \quad (11)$$

where the maximization is carried out over non-restricted frequency sets that are not already fully scheduled. Thus, the channel delay desirability can be defined as the ratio between the maximum instant spectral efficiency over all free frequency sets, and the maximum instant spectral efficiency over all unavailable frequency sets.

The overall restrictive reuse scheduling metric utilized by dynamic restrictive reuse scheduler component 402 can thus be of one of the following forms:

$$S_i = \begin{cases} F_i T_i & \text{peak diversity} \\ F_i D_i & \text{delay diversity} \\ F_i T_i D_i & \text{peak \& delay diversity} \end{cases} \quad (12)$$

if product is used to combine the metrics. As described above, the combining function could also be other functions such as weighted sum, max etc. For each time slot, dynamic restrictive reuse scheduler component 402 can rank the scheduling metric and assign a top user an appropriate number of subcarriers in the user's winning frequency set. The scheduled subcarriers can then be excluded from the free frequency set(s), and metrics can be recomputed for users who are not already scheduled. This process can be iterated until all subcarriers are assigned. The scheduling metric can be further combined with other QoS related metric $Q_i$ to make the final scheduling decision. In this aspect, only the fairness metric is used to illustrate the flexibility of the dynamic restricted reuse scheduler.

Figure 5:
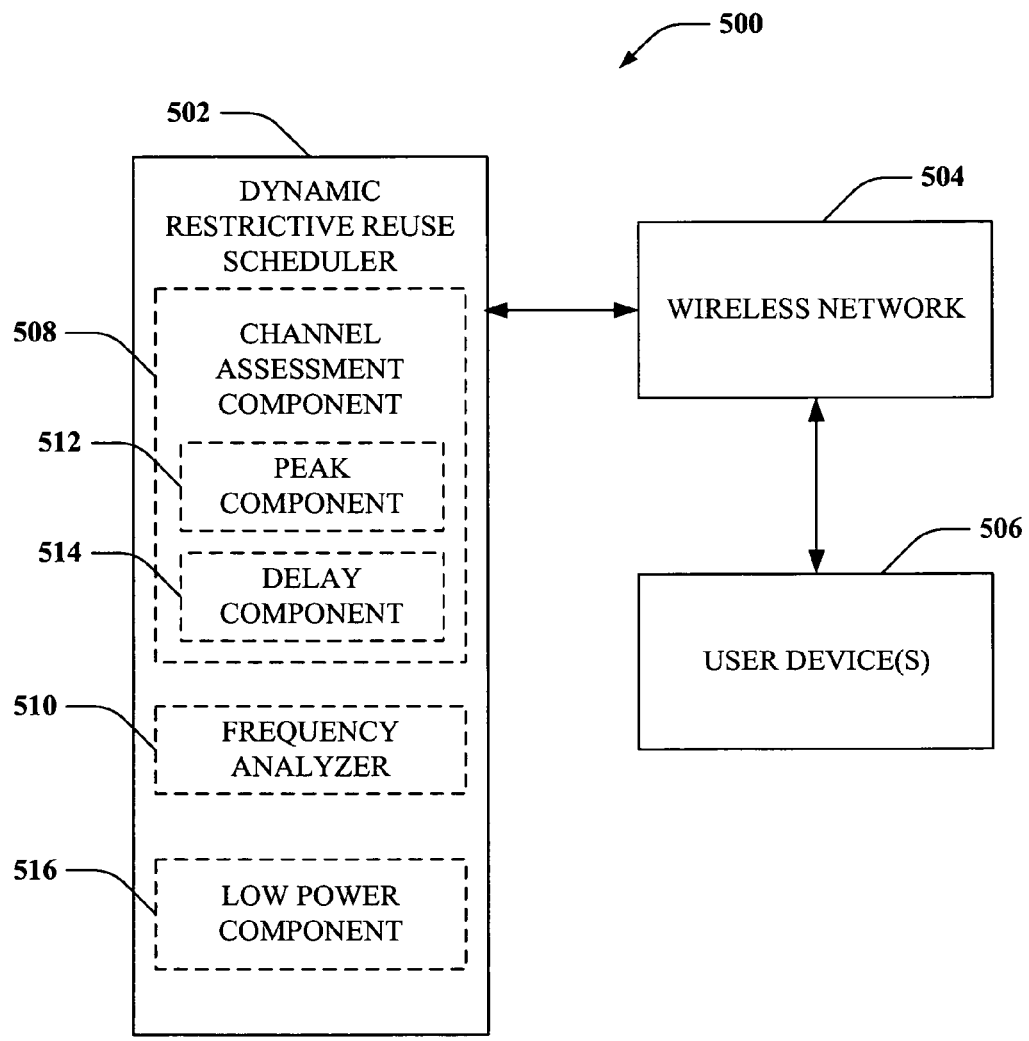
FIG. 5 is an illustration of a system that facilitates dynamically adjusting power consumption for transmissions to user devices with sufficiently strong channel conditions, in accordance with various aspects.

FIG. 5 is an illustration of a system 500 that facilitates dynamically adjusting power consumption for transmissions to user devices with sufficiently strong channel conditions, in accordance with various aspects. The system 500 comprises a dynamic restrictive reuse scheduler component 502, a wireless network 504, and one or more user devices 506, all of which are operatively associated with each other, as detailed above with regard the preceding figures. Dynamic restrictive reuse scheduler component 502 comprises a frequency analyzer 510 and a channel assessment component 508, which in turn comprises a peak component 512 and a delay component 514. Peak component 512 can determine a channel peak desirability metric that can be employed in conjunction with a channel delay desirability metric as described with regard to FIG. 4 to determine an overall scheduling metric, $S_i$, that can be utilized by dynamic restrictive reuse scheduler component 502 when assigning frequency sets to the one or more user devices 506.

Dynamic restrictive reuse scheduler component 502 further comprises a low power component 506 that facilitates power conservation based at least in part on channel quality associated with one or more user devices 506. Restrictive reuse can introduce bandwidth partial loading due to restricted sets in each sector. For instance, in diagram 100 of FIG. 1, the 011, 010 and 001 sets are not used in sectors with a value of 0. The low power component 516 of the dynamic restrictive reuse scheduler 502 can transmit at reduced power on restricted port sets to user devices 506 with good channel conditions. In this manner, the bandwidth partial loading penalty can be avoided. To enable universal reuse, equations (9) and (11) can be evaluated over all frequency sets that are not scheduled, without the restrictive reuse sector value restriction. In addition, the spectral efficiency of the restricted frequency sets can take into account the lowered transmission power.

Figure 6:
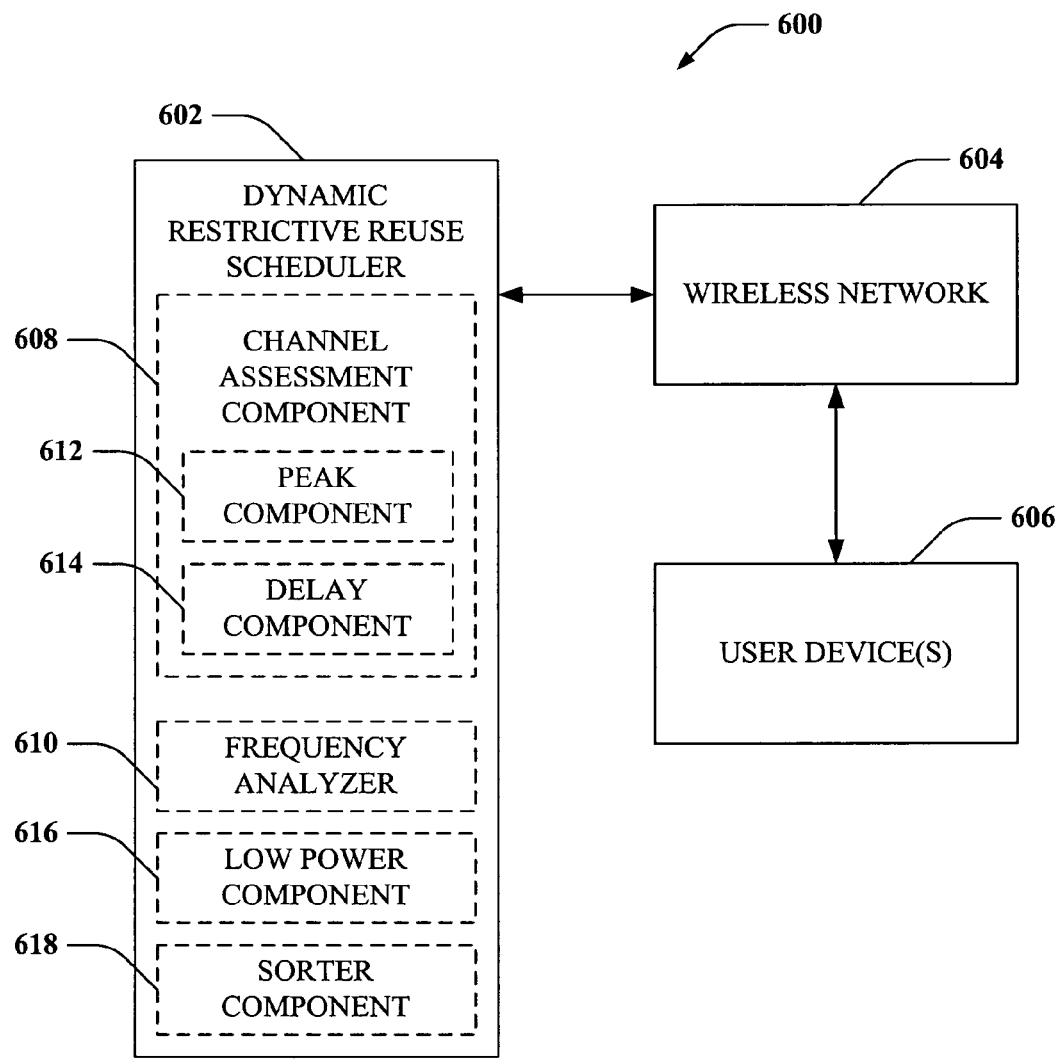
FIG. 6 is an illustration of a system that facilitates providing multiple reuse frequency sets to a user.

FIG. 6 is an illustration of a system 600 that facilitates providing multiple reuse frequency sets to a user. System 600 comprises a dynamic restrictive reuse scheduler 602 having a channel assessment component 608, a frequency analyzer 610, and a low power component 616, and which is operatively associated with a wireless network 604 and one or more user devices 606. Channel assessment component 608 comprises a peak component 612 that determines a channel peak desirability metric for a each user device 606 and a delay component 614 that evaluates a channel delay desirability metric for each respective user device, which metrics are then employed by the restrictive reuse scheduler 602 to determine a winning user device. The winning user device can then be assigned the reuse frequency set in question.

Dynamic restrictive reuse scheduler 602 further comprises a sorter component 618 that facilitates relaxing various constraints associated with restrictive reuse scheduling and providing multiple reuse frequency set assignments. Sorter component 618 can ensure that a user device 606 that has been assigned a reuse frequency set in a previous round of channel desirability assessment is not excluded from future iterations of frequency set awarding. For example, when employing a static restrictive reuse scheduler protocol, a user device that has been assigned/awarded a reuse frequency set based on a high overall channel desirability score (e.g., a function of channel peak desirability and delay desirability metrics) can typically be excluded from future iterations of frequency assignment because the user device has successfully been assigned a reuse frequency set. By relaxing this exclusion restriction, a given user device 606 can be awarded multiple frequency sets. A final channel assignment for a user device 606 can be the union of all subcarriers that the user device 606 has been assigned over the multiple frequency sets. Moreover, multiple frequency set assignment can increase peak rates for such users, which in turn mitigates delay associated with communication transmission.

Figure 7:
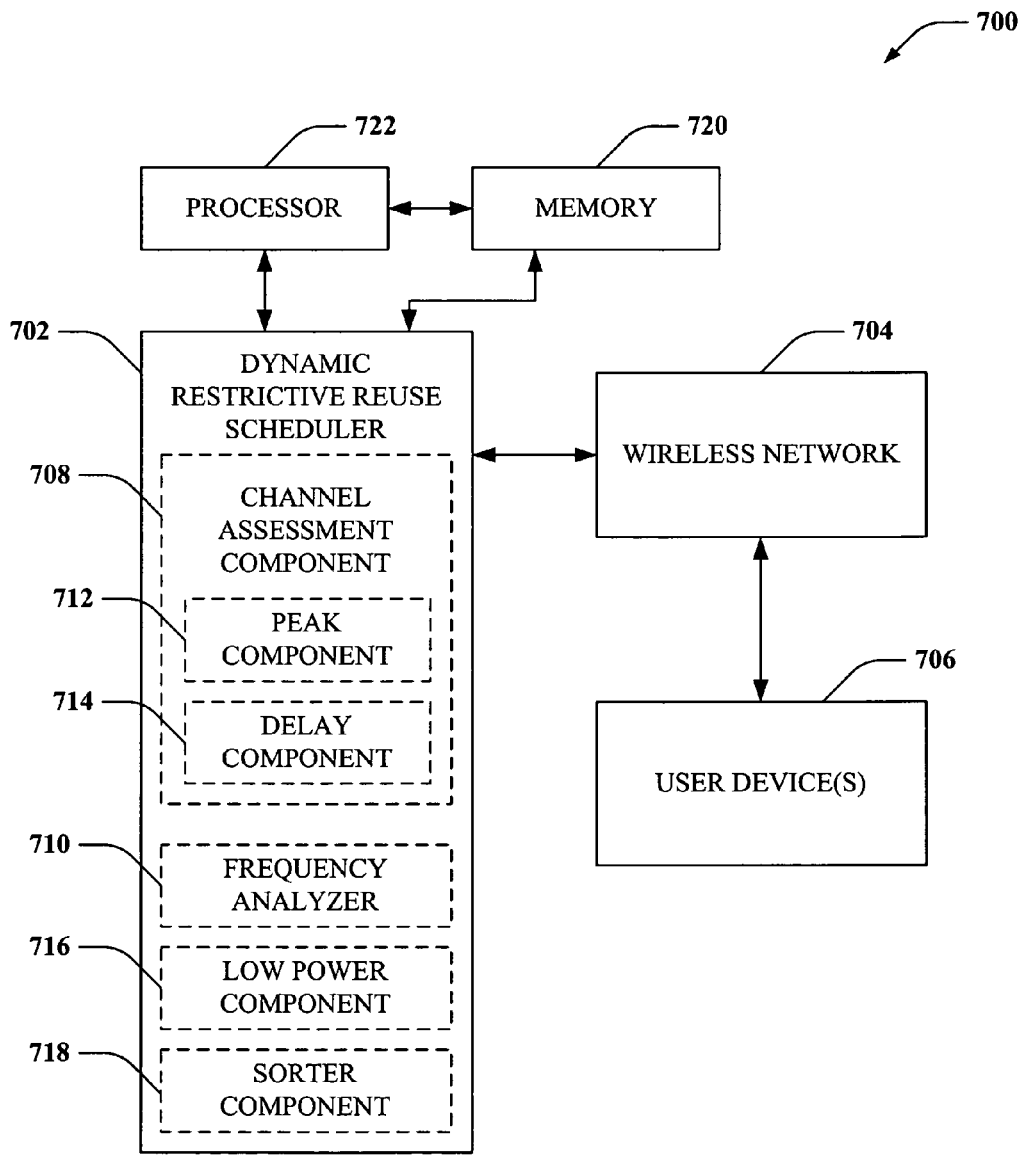
FIG. 7 illustrates a system that facilitates dynamic packet-based restrictive reuse scheduling of communication frequency reuse sets without requiring assignment of connections to a static frequency reuse set.

FIG. 7 illustrates a system 700 that facilitates dynamic packet-based restrictive reuse scheduling of communication frequency reuse sets without requiring assignment of connections to a static frequency reuse set. System 700 comprises a plurality of components similar to the systems and/or components described with regard to the preceding figures, including a dynamic restrictive reuse scheduler 702 that is operatively coupled to a wireless network 704 and one or more user devices 706. Dynamic restrictive reuse scheduler component 702 further comprises a channels assessment component 708 that determines overall channel desirability as a function of a channel peak desirability metric determined by a peak component 712 and a channel delay desirability metric determined by delay component 714 on a per user device basis. Additionally, dynamic restrictive reuse scheduler component 702 comprises a frequency analyzer 710 that assess total available bandwidth in wireless network 704 and/or regions thereof, a low power component 716 that facilitates low-power transmission to users having high quality connections, and a sorter component 718 that facilitates multiple reuse frequency set assignments, as detailed above with regard to preceding figures.

System 700 can additionally comprise memory 720 that is operatively coupled to dynamic restrictive reuse scheduler component 702 and that stores information related to channel desirability algorithms, metrics, available frequency sets, user device frequency assignment, etc., and any other suitable information related to providing dynamic restrictive reuse scheduling of frequency reuse sets to one or more users. A processor 722 can be operatively connected to dynamic restrictive reuse scheduler component 702 (and/or memory 720) to facilitate analysis of information related to fairness criteria, desirability metrics, frequency reuse, and the like. It is to be appreciated that processor 722 can be a processor dedicated to analyzing and/or generating information received by dynamic restrictive reuse scheduler component 702, a processor that controls one or more components of system 700, and/or a processor that both analyzes and generates information received by dynamic restrictive reuse scheduler component 702 and controls one or more components of system 700.

Memory 720 can additionally store protocols associated with generating frequency assignments, metrics, etc., such that system 700 can employ stored protocols and/or algorithms to achieve dynamic restrictive reuse frequency hopping as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 720 of the subject systems and methods is intended to comprise, without being limited to, these and any other suitable types of memory.

Figure 8:
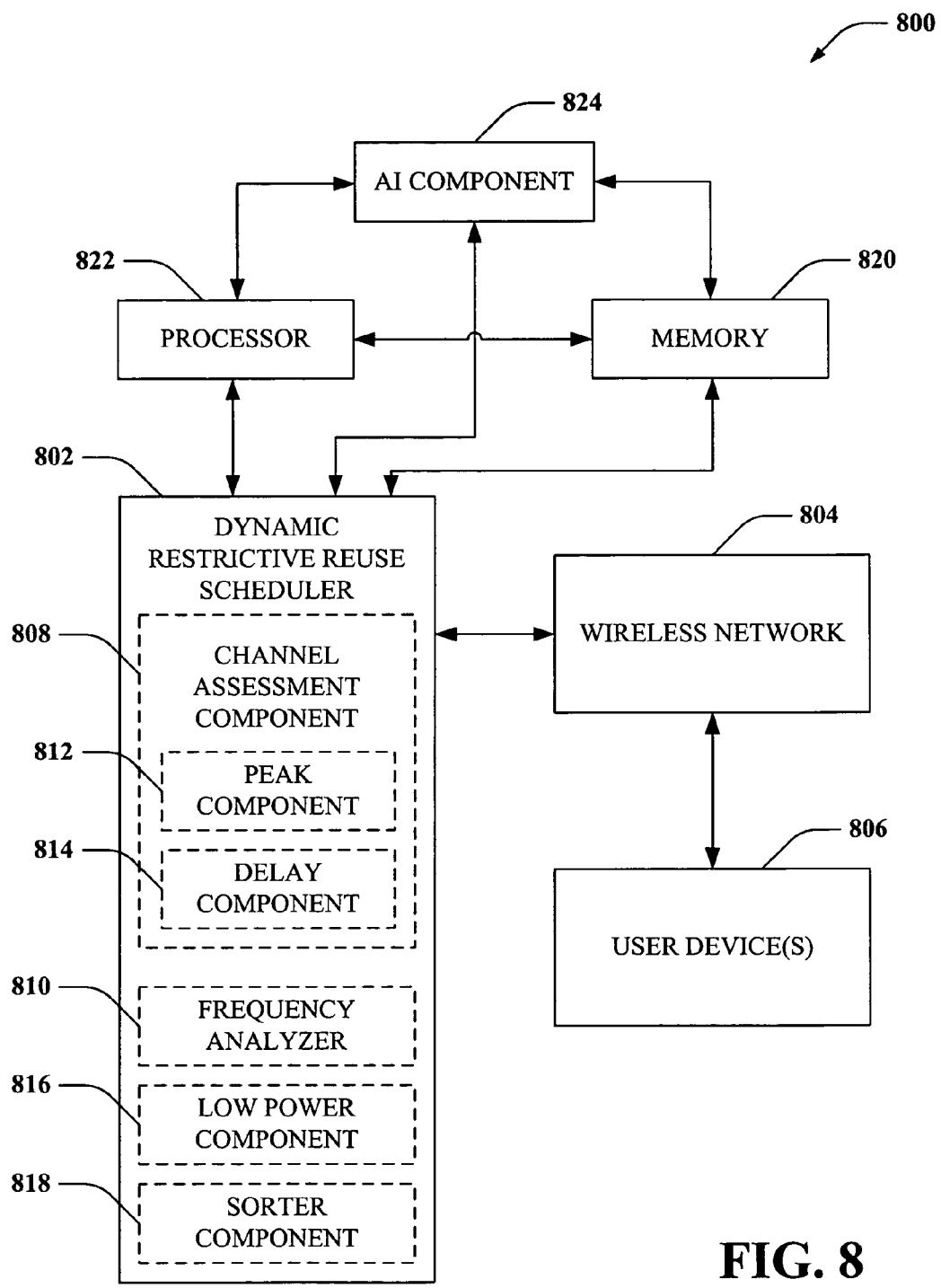
FIG. 8 is an illustration of a system that facilitates assigning frequency reuse sets to user devices based on assessment of channel desirability metrics for the user devices.

FIG. 8 is an illustration of a system 800 that facilitates assigning frequency reuse sets to user devices based on assessment of channel desirability metrics for the user devices. System 800 comprises a dynamic restrictive reuse scheduler 802 that is operatively coupled to a wireless network 804 and one or more user devices 806. Dynamic restrictive reuse scheduler 802 is similar to the scheduler 702, in that it comprises a channel assessment component 808 that facilitates determining various metrics associated with frequency set allocation, and a frequency analyzer 810 that assesses a total available amount of bandwidth and generates a plurality of frequency reuse subsets as detailed with regard to FIG. 1, which can be assigned to various user devices 806 to mitigate interference in between user devices 806 and base tower transmissions in one or more sectors of wireless network 804. Additionally, dynamic restrictive reuse scheduler 802 comprises a low power component 816 that can transmit signal(s) to one or more user devices 806 at low power upon a determination that the one or more user devices 806 have sufficiently strong channel quality (e.g., sufficient resources), and a sorter component 818 that can optionally include user devices 806 already assigned one or more frequency reuse sets in the set of users still requiring assignment, permitting a user to win multiple sets of frequencies, which can facilitate increasing a peak transmission rate for the user while mitigating channel delay. Channel assessment component 808 comprises a peak component 812 that assesses a channel peak desirability metric for each user device 806, and a delay component 814 that assesses a channel delay desirability metric to determine whether channel connection should be delayed, either or both of which metrics can be employed in conjunction with a fairness metric derived by restrictive reuse scheduler 802 to identify a winning user device 806 to which a frequency reuse set can be assigned.

System 800 can additionally comprises a memory 820 and a processor 822 as detailed above with regard to FIG. 7. Moreover, an AI component 824 can be operatively associated with dynamic restrictive reuse scheduler component 802 and can make inferences regarding channel connection quality, inclusion/exclusion of a winning user device 806 from subsequent assignment rounds, whether channel delay is desirable (e.g., due to a lack of available frequency reuse sets, . . . ), etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, AI component 824 can infer an appropriate frequency reuse set assignment based at least in part on, for instance, available frequency sets, total number of user devices 806, channel desirability metrics, user device resource requirements, etc. According to this example, it can be determined that a user device 806 has sufficient transmission resource assignments, such as bandwidth, etc., in order to justify excluding the user device from a resource assignment despite high metric scores for the user device 806, and the like. AI component 824, in conjunction with processor 814 and/or memory 812, can infer that such a user device should be excluded in a present round of frequency assignment. In such a case, AI component 824 can facilitate resource assignment in the most efficient manner possible to facilitate bandwidth allocation and reuse, mitigate transmission costs, etc. It will be appreciated that the foregoing examples are illustrative in nature and are not intended to limit the scope of inferences that can be made by the AI component 824 or the manner in which the AI component 824 makes such inferences.

Figure 9:
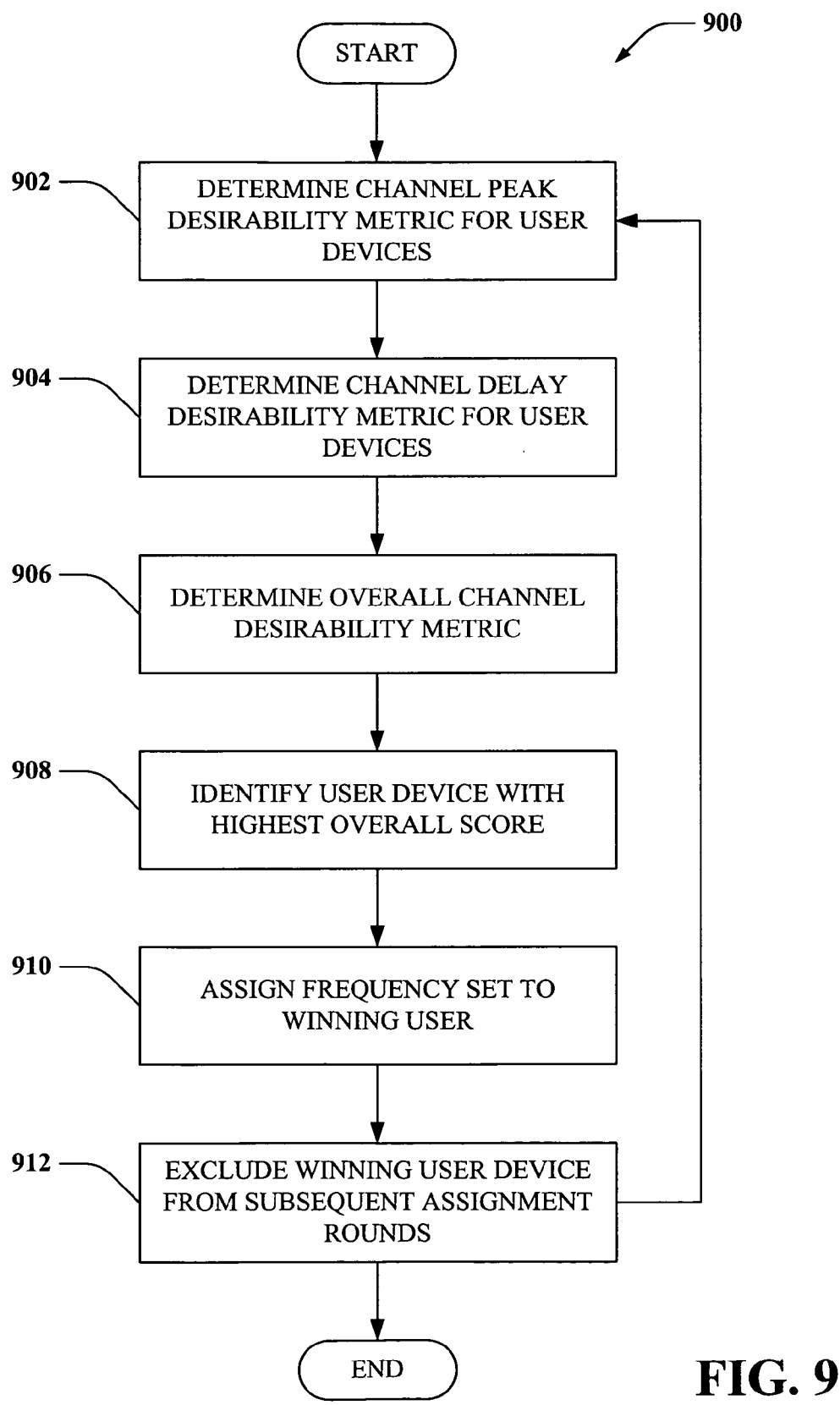
FIG. 9 illustrates a methodology for providing dynamic frequency reuse set assignments to user devices in a wireless network in accordance with various embodiments.
Figure 10:
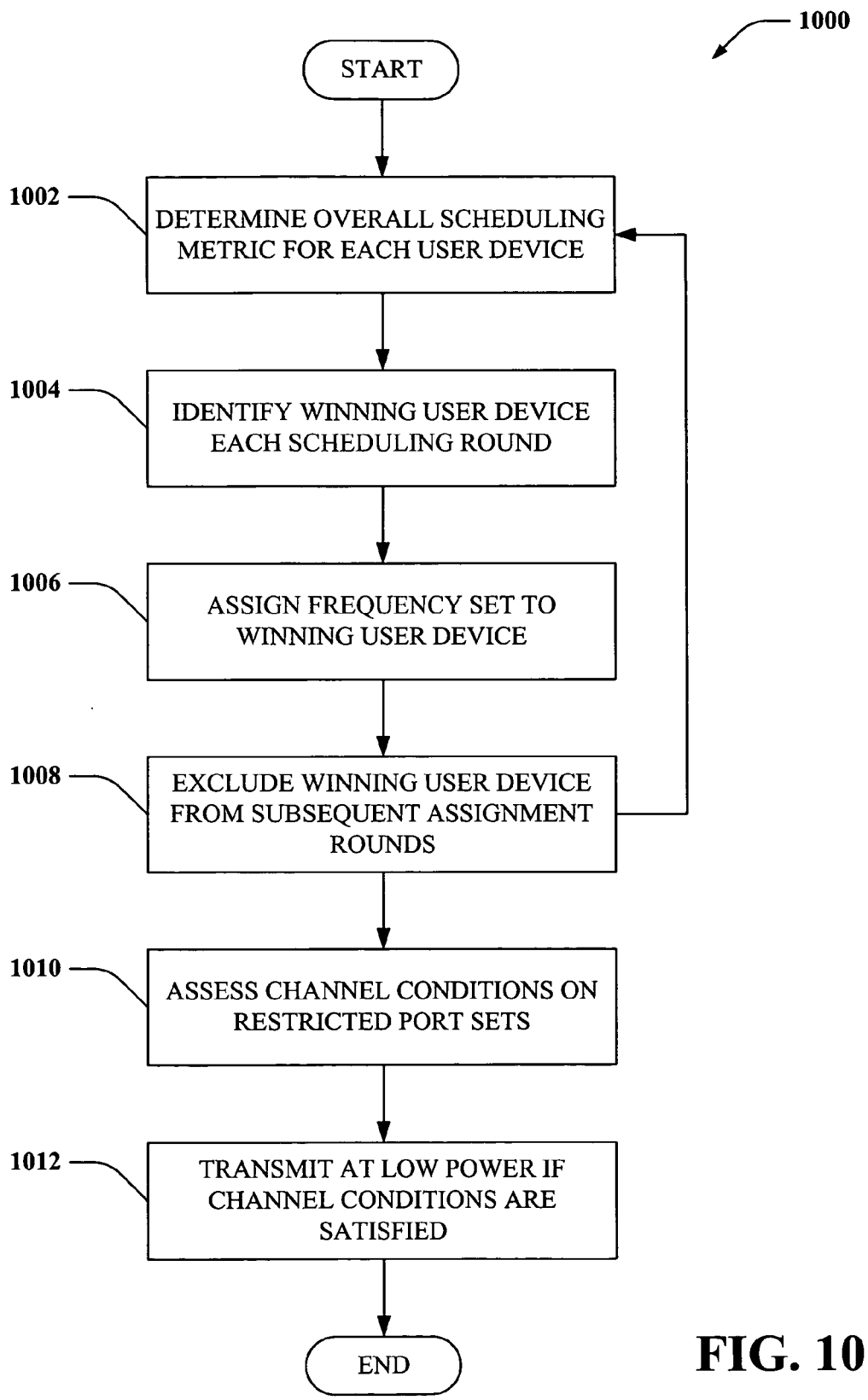
FIG. 10 illustrates a methodology for dynamically scheduling frequency reuse set assignments and mitigating resource waste in accordance with various embodiments.
Figure 11:
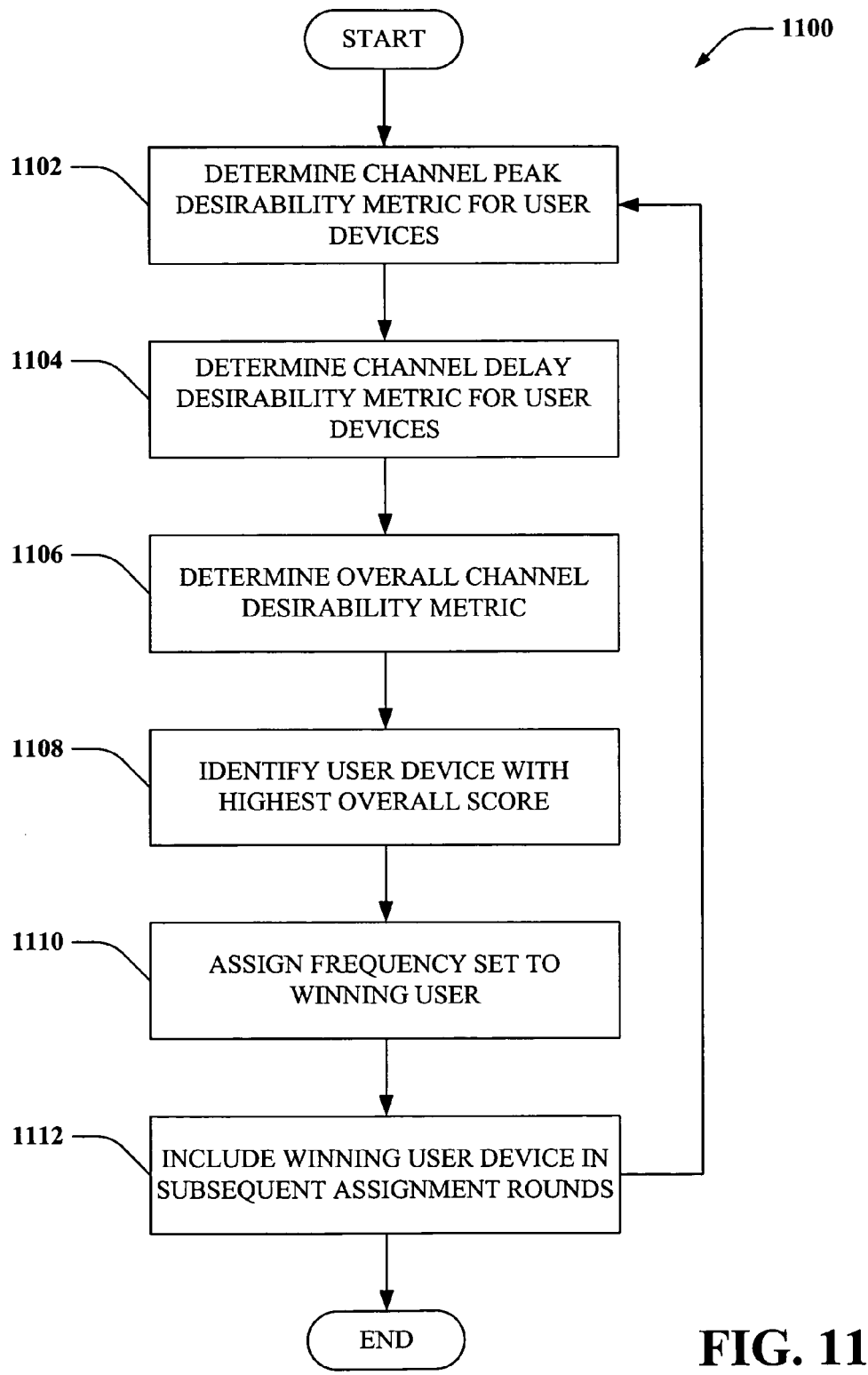
FIG. 11 illustrates a methodology for dynamically assigning frequency reuse sets to user devices in a wireless communication environment while permitting a user device to obtain multiple frequency sets.

Referring to FIGS. 9-11, methodologies relating to generating supplemental system resource assignments are illustrated. For example, methodologies can relate to packet-based dynamic restrictive reuse scheduling in an OFDM environment, an OFDMA environment, a CDMA environment, a TDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 9 illustrates a methodology 900 for providing dynamic frequency reuse set assignments to user devices in a wireless network in accordance with various embodiments. At 902, a channel peak desirability metric, $T_i$, can be determined for each user device in the set of all user devices in a network region, or a subset thereof. For instance, the peak desirability metric for each user device can be derived using equations (8) and (9) described above with regard to FIG. 4. At 904, a channel delay desirability metric, $D_i$, can be assessed for each user device in conjunction with equations (10) and (11), also described with regard to FIG. 4. Once such metrics have been evaluated for all user devices in the set, one or both metrics can be multiplied by a fairness metric, $F_i$, for the user device, as described with regard to FIG. 1, in order to determine an overall channel desirability metric, $S_i$, using equation (12), at 906. Once the overall channel desirability metric has been derived for each user device in the set, a winning user device (e.g., a user device with the highest $S_i$ value) can be identified at 908.

At 910, for each time slot, the winning user device can be assigned an appropriate number of subcarriers in the user device's winning frequency set. At 912, the scheduled subcarriers can then be excluded from the free frequency set(s), and method 900 can revert to 902, where metrics can be recomputed for user devices not already scheduled. Method 900 can be iterated until all subcarriers are assigned. In this manner, method 900 can facilitate providing packet-based dynamic restrictive reuse scheduling of frequency sets without requiring assignment of connections to a static frequency reuse set.

FIG. 10 illustrates a methodology 1000 for dynamically scheduling frequency reuse set assignments and mitigating resource waste in accordance with various embodiments. At 1002, an overall scheduling metric, $S_i$, can be evaluated for each user device in a set of user devices communicating over a wireless network. The metric $S_i$ can be a function of several metrics, as described above with regard to FIGS. 1-4 and equations (1)-(12). At 1004, a winning user device can be identified for each round of metric evaluation. An appropriate number of subcarriers in the user device's winning frequency set at 1006. At 1008, the winning user device can be excluded (e.g., removed from a list of user devices) in order to ensure that other user devices can receive frequency assignments during future iterations of method 1000. The method can revert to 1002 for further iteration until all user devices in the set have been assigned a set of frequencies and/or subcarriers.

At 1010, channel conditions can be evaluated and, if conditions warrant, at 1012 transmission to user devices with good channel conditions can be performed using low power in the restricted port sets in order to mitigate bandwidth partial loading due to the restricted sets. In order to enable universal reuse, equations (4-7) and (9) can be evaluated over all frequency sets that are not scheduled, and without the restrictive reuse value restrictions described with regard to FIG. 1. In this manner, method 1000 can facilitate reducing power consumption to mitigate transmission costs.

FIG. 11 illustrates a methodology 1100 for dynamically assigning frequency reuse sets to user devices in a wireless communication environment while permitting a user device to obtain multiple frequency sets. At 1102, a channel peak desirability metric, $T_i$, can be determined for each user device in a set of user devices in a network region, or a subset thereof. The channel peak desirability metric for each user device can be derived using equations (8) and (9) described above with regard to FIG. 4. At 1104, a channel delay desirability metric, $D_i$, can be assessed for each user device in conjunction with equations (10) and (11), also described with regard to FIG. 4. Once such metrics have been evaluated for all user devices in the set, one or both metrics can be multiplied by a fairness metric, $F_i$, for the user device, as described with regard to FIG. 1, in order to determine an overall channel desirability metric, $S_i$, using equation (12), at 1106. Once the overall channel desirability metric has been derived for each user device in the set, a winning user device (e.g., a user device with the highest $S_i$ value) can be identified at 1108.

At 1110, for each time slot, the winning user device can be assigned an appropriate number of subcarriers in the user device's winning frequency set. In order to permit a user device to win over multiple frequency sets, at 1112, the winning user device can be included in the remaining list of unscheduled user devices. Thus, if a frequency set assignment at 1110 is not sufficient, such that the winning device can potentially have a highest overall scheduling metric score in a subsequent scheduling round, then the user device can be permitted to obtain subsequent frequency set assignments. Method 1100 can then revert to 1102 for further iterations of dynamic scheduling. A user device's final channel assignment can be the union of all subcarriers won by the user device over multiple frequency set assignment rounds, which can facilitate increasing peak rate of communication for the user device while mitigating delay.

Figure 12:
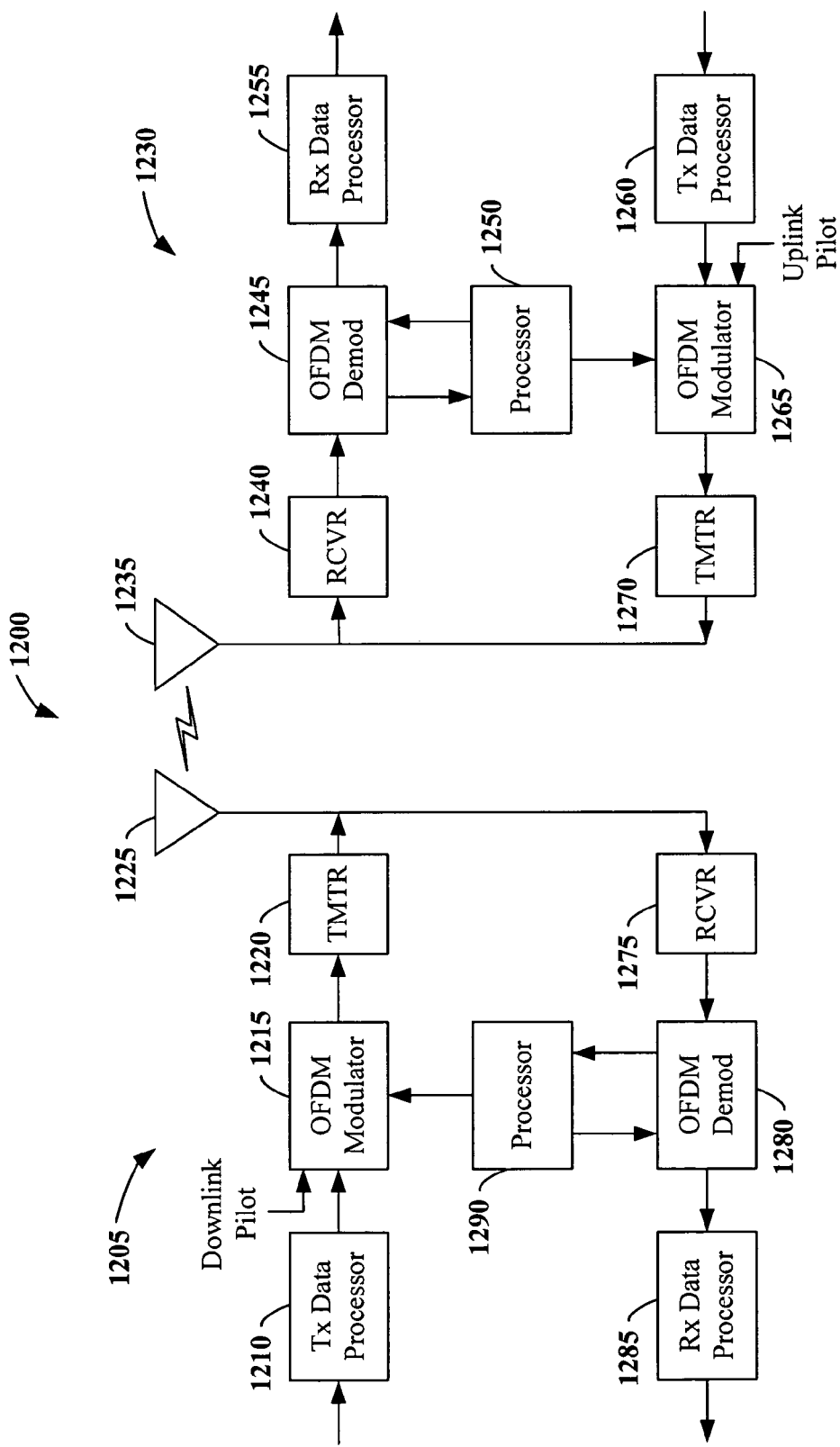
FIG. 12 is an illustration of a wireless network environment that can be employed in conjunction with the various systems and methods described herein.

FIG. 12 shows an exemplary wireless communication system 1200. The wireless communication system 1200 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-8) and/or methods (FIGS. 9-11) described herein to facilitate wireless communication there between.

Referring now to FIG. 12, on a downlink, at access point 1205, a transmit (TX) data processor 1210 receives, formats, codes, interleaves, and modulates (or symbol maps) traffic data and provides modulation symbols ("data symbols"). An OFDM modulator 1215 receives and processes the data symbols and pilot symbols and provides a stream of OFDM symbols. An OFDM modulator 1220 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1220 can transform each set of N transmit symbols to the time domain using an N-point IFFT to obtain a "transformed" symbol that contains N time-domain chips. OFDM modulator 1220 typically repeats a portion of each transformed symbol to obtain a corresponding OFDM symbol. The repeated portion is known as a cyclic prefix and is used to combat delay spread in the wireless channel.

A transmitter unit (TMTR) 1220 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the terminals. At terminal 1230, an antenna 1235 receives the downlink signal and provides a received signal to a receiver unit (RCVR) 1240. Receiver unit 1240 conditions (e.g., filters, amplifies, and frequency downconverts) the received signal and digitizes the conditioned signal to obtain samples. An OFDM demodulator 1245 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1250 for channel estimation. OFDM demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (i.e., symbol demaps), deinterleaves, and decodes the data symbol estimates to recover the transmitted traffic data. The processing by OFDM demodulator 1245 and RX data processor 1255 is complementary to the processing by OFDM modulator 1215 and TX data processor 1210, respectively, at access point 1200.

On the uplink, a TX data processor 1260 processes traffic data and provides data symbols. An OFDM modulator 1265 receives and multiplexes the data symbols with pilot symbols, performs OFDM modulation, and provides a stream of OFDM symbols. The pilot symbols may be transmitted on subbands that have been assigned to terminal 1230 for pilot transmission, where the number of pilot subbands for the uplink may be the same or different from the number of pilot subbands for the downlink. A transmitter unit 1270 then receives and processes the stream of OFDM symbols to generate an uplink signal, which is transmitted by the antenna 1235 to the access point 1210.

At access point 1210, the uplink signal from terminal 1230 is received by the antenna 1225 and processed by a receiver unit 1275 to obtain samples. An OFDM demodulator 1280 then processes the samples and provides received pilot symbols and data symbol estimates for the uplink. An RX data processor 1285 processes the data symbol estimates to recover the traffic data transmitted by terminal 1235. A processor 1290 performs channel estimation for each active terminal transmitting on the uplink. Multiple terminals may transmit pilot concurrently on the uplink on their respective assigned sets of pilot subbands, where the pilot subband sets may be interlaced.

Processors 1290 and 1250 direct (e.g., control, coordinate, manage, etc.) operation at access point 1210 and terminal 1235, respectively. Respective processors 1290 and 1250 can be associated with memory units (not shown) that store program codes and data. Processors 1290 and 1250 can also perform computations to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1290 and 1250.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of dynamically scheduling orthogonal resource sets for reuse by user devices to reduce inter-cell interference comprising:
   determining a fairness metric for each user device in a wireless communication region;
   determining a channel peak desirability metric based on different instant and average channel qualities over multiple orthogonal resource sets for each user device; and
   determining an overall scheduling metric for each user device, the overall scheduling metric is the output of a metric combining function of the fairness metric and the channel peak desirability metric.

2. The method of claim 1, further comprising identifying a user device with a highest overall scheduling metric score as a winning user device, and awarding a portion of the orthogonal resource set that corresponds to the winning channel metric of the winning user device.

3. The method of claim 2, further comprising reiterating the method of claim 1 after awarding the orthogonal resource set to the winning user device until all user devices have been assigned an orthogonal resource set or all resources have been assigned.

4. The method of claim 1, where the orthogonal resource sets are at least one of frequency sets, time slot sets, code sets, carrier sets, and orthogonal SDMA dimensions.

5. The method of claim 4, where the orthogonal resource sets are frequency sets comprising at least one of OFDMA, IFDMA, and LFDMA subcarrier sets.

6. The method of claim 1, where the metric combining function is at least one of a product, a weighted sum and a maximization function.

7. A system that facilitates dynamic restrictive reuse orthogonal resource sets scheduling in a wireless network environment, comprising:
   a restrictive reuse scheduling component that determines an overall scheduling metric for each user device in the wireless network environment;
   a peak component that determines an overall channel peak desirability metric for each user device; the channel peak desirability metric based on different instant and average channel qualities over multiple orthogonal resource sets; and
   a delay component that determines a channel delay desirability metric for each user device.

8. The system of claim 7, the overall scheduling metric is the output of a metric combining function of the fairness metric and at least one of the overall channel desirability metric and the channel delay desirability metric, wherein the metric combining function is either a product, a weight sum or a maximization function.

9. The system of claim 7, the restrictive reuse scheduling component designates a user device having a highest scoring overall scheduling metric relative to all other user devices in the wireless network as a winning user device, the restrictive reuse scheduling component awards a orthogonal resource set to the winning user device, the orthogonal resource set comprises one or more subcarriers sufficient to meet resource requirements of the winning user device.

10. The system of claim 9, further comprising a sorter component that excludes the winning user device from subsequent iterations of orthogonal resource set assignment when it is desired that all user devices sequentially receive a orthogonal resource set assignment, and includes the winning user device in subsequent iterations of orthogonal resource set assignment when it is desired that a device receive multiple orthogonal resource set assignments.

11. The system of claim 7, where the orthogonal resource sets are at least one of frequency sets, time slot sets, code sets, carrier sets, and orthogonal SDMA dimensions.

12. The system of claim 7, where the orthogonal resource sets are frequency sets comprising at least one of OFDMA, IFDMA, and LFDMA subcarrier sets.

13. An apparatus that facilitates scheduling orthogonal resource sets assignments for user devices in a wireless communication environment, comprising:
   means for determining a fairness metric for each user device in the communication environment;
   means for determining an overall channel peak desirability metric for each user device, the channel peak desirability metric based on different instant and average channel qualities over multiple orthogonal resource sets;
   means for determining a channel delay desirability metric for each device; and
   means for determining an overall scheduling metric score for each device, the scheduling metric score is the output of a metric combining function of the fairness metric and one or both of the overall channel peak desirability metric and the and the channel delay desirability metric.

14. The apparatus of claim 13, further comprising means for identifying a user device having the highest overall scheduling metric score relative to overall scheduling metric scores for all other users in the wireless environment as a winning user device, the winning user device is awarded a orthogonal resource set comprising one or more subcarriers.

15. The apparatus of claim 13, the means for determining the fairness metric employs at least one of an equal grade of service protocol and a proportional fair protocol.

16. The apparatus of claim 13, where the orthogonal resource sets are at least one of frequency sets, time slot sets, code sets, carrier sets, and SDMA dimensions.

17. The apparatus of claim 13, where the orthogonal resource sets are frequency sets comprising at least one of OFDMA, IFDMA or LFDMA subcarrier sets.

18. The apparatus of claim 13, where the metric combining function is one of a product, a weight sum or a maximization function.

19. A computer-readable medium having stored thereon computer-executable instructions for:
   determining fairness metric for each user device in a wireless network environment;

determining an overall channel peak desirability metric for each user device; the channel peak desirability metric based on different instant and average channel qualities over multiple orthogonal resource sets; and determining a channel delay desirability metric for each user device.

20. The computer-readable medium of claim 19, further comprising instructions for determining an overall scheduling metric score for each user device, the overall scheduling metric score is the output of a metric combining function of the fairness metric and at least one of the overall channel peak desirability metric and the channel delay desirability metric for the user device.

21. The computer readable medium of claim 20, where the metric combining function is at least one of a product, a weight sum and a maximization function.

* * * * *